(12) United States Patent
Namba

(10) Patent No.: US 12,084,055 B2
(45) Date of Patent: Sep. 10, 2024

(54) AUTOMATIC DRIVING ASSISTANCE SYSTEM

(71) Applicant: SUBARU CORPORATION, Tokyo (JP)

(72) Inventor: Ryosuke Namba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 64 days.

(21) Appl. No.: 17/580,797

(22) Filed: Jan. 21, 2022

(65) Prior Publication Data
US 2022/0242408 A1    Aug. 4, 2022

(30) Foreign Application Priority Data
Feb. 1, 2021    (JP) .................................. 2021-014647

(51) Int. Cl.
*B60W 30/14* (2006.01)
*B60W 30/18* (2012.01)

(52) U.S. Cl.
CPC ..... *B60W 30/146* (2013.01); *B60W 30/18159* (2020.02); *B60W 2420/403* (2013.01); *B60W 2552/05* (2020.02); *B60W 2720/106* (2013.01)

(58) Field of Classification Search
CPC ...................... B60W 30/146; B60W 30/18159
See application file for complete search history.

(56) References Cited

U.S. PATENT DOCUMENTS

2016/0318490 A1*  11/2016  Ben Shalom ... B60W 30/18109
2019/0250639 A1*   8/2019  Xu ................... G08G 1/096775

FOREIGN PATENT DOCUMENTS

JP    2011-2221757 A    11/2011

\* cited by examiner

*Primary Examiner* — Imran K Mustafa
(74) *Attorney, Agent, or Firm* — TROUTMAN PEPPER HAMILTON SANDERS LLP

(57) ABSTRACT

An automatic driving assistance system to be applied to a vehicle includes an intersection detector and an ACC-set-vehicle-speed changing section. The intersection detector detects, on the basis of a traveling environment in a predetermined range of a target traveling course in front of the vehicle, a set of intersections whose interval is shorter than a predetermined interval within the predetermined range of the target traveling course in front of the vehicle. The traveling environment is to be acquired on the basis of road map data and traveling-environment data on an environment in front of the vehicle. The ACC-set-vehicle-speed changing section changes, in a case where the intersection detector detects the set of intersections whose interval is shorter than the predetermined interval, an ACC set vehicle speed from a first ACC set vehicle speed that is set to a second ACC set vehicle speed.

7 Claims, 3 Drawing Sheets

AUTOMATIC DRIVING ASSISTANCE SYSTEM

CROSS-REFERENCE TO RELATED APPLICATION

The present application claims priority from Japanese Patent Application No. 2021-014647 filed on Feb. 1, 2021, the entire contents of which are hereby incorporated by reference.

BACKGROUND

The technology relates to an automatic driving assistance system that assists driving of a vehicle.

An automatic driving assistance system operates in such a manner as to determine, when a driver or an operator inputs a destination, a traveling route from a current position to the destination, and execute automatic driving of an own vehicle along all of or a portion of the traveling route on behalf of the driver. While the own vehicle is automatically traveling on an ordinary road, the automatic driving assistance system recognizes, with a sensing device such as a camera, a traveling environment in front of the own vehicle to constantly monitor presence of a preceding vehicle, a color of a signal indicated by a traffic light, and a direction indicated by an arrow signal light, for example.

The automatic driving assistance system is configured to execute an adaptive cruise control (ACC) that causes the own vehicle to travel following a preceding vehicle. When detecting a preceding vehicle traveling ahead of the own vehicle on a target traveling course, the automatic driving assistance system activates the ACC to control the speed of the own vehicle to a predetermined speed on the basis of an intervehicle distance between the own vehicle and the preceding vehicle and a relative vehicle speed between the own vehicle and the preceding vehicle, for example. In addition, on the basis of data on an environment in front of the own vehicle obtained by the sensing device, such as a vehicle-mounted camera, the ACC recognizes a color of a signal indicated by a traffic light installed at an intersection. In a case where the traffic light indicates a green signal, the ACC causes the own vehicle to travel at an ACC set vehicle speed set by the driver within a speed limit of the road.

As such an automatic driving assistance system, Japanese Unexamined Patent Application Publication No. 2011-221757, for example, discloses a driving assistance apparatus configured to, in a case where intersections at which traffic lights are respectively installed are successively present, change assistance modes (i.e., assistance levels) in which the own vehicle is to be assisted in accordance with lighting statuses of the traffic lights.

SUMMARY

An aspect of the technology provides an automatic driving assistance system to be applied to a vehicle. The automatic driving assistance system includes an intersection detector and an ACC-set-vehicle-speed changing section. The intersection detector is configured to detect, on the basis of a traveling environment in a predetermined range of a target traveling course in front of the vehicle, a set of intersections whose interval is shorter than a predetermined interval within the predetermined range of the target traveling course in front of the vehicle. The traveling environment is to be acquired on the basis of road map data to be acquired by a road map data acquisition section and traveling-environment data on an environment in front of the vehicle to be acquired by a camera unit. The ACC-set-vehicle-speed changing section is configured to change, in a case where the intersection detector detects the set of intersections whose interval is shorter than the predetermined interval, an ACC set vehicle speed from a first ACC set vehicle speed that is set to a second ACC set vehicle speed.

An aspect of the technology provides an automatic driving assistance system to be applied to a vehicle. The automatic driving assistance system includes circuitry. The circuitry is configured to detect, on the basis of a traveling environment in a predetermined range of a target traveling course in front of the vehicle, a set of intersections whose interval is shorter than a predetermined interval within the predetermined range of the target traveling course in front of the vehicle. The traveling environment is to be acquired on the basis of road map data and traveling-environment data on an environment in front of the vehicle. The circuitry is configured to change, in a case where the circuitry detects the set of intersections whose interval is shorter than the predetermined interval, an ACC set vehicle speed from a first ACC set vehicle speed that is set to a second ACC set vehicle speed.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
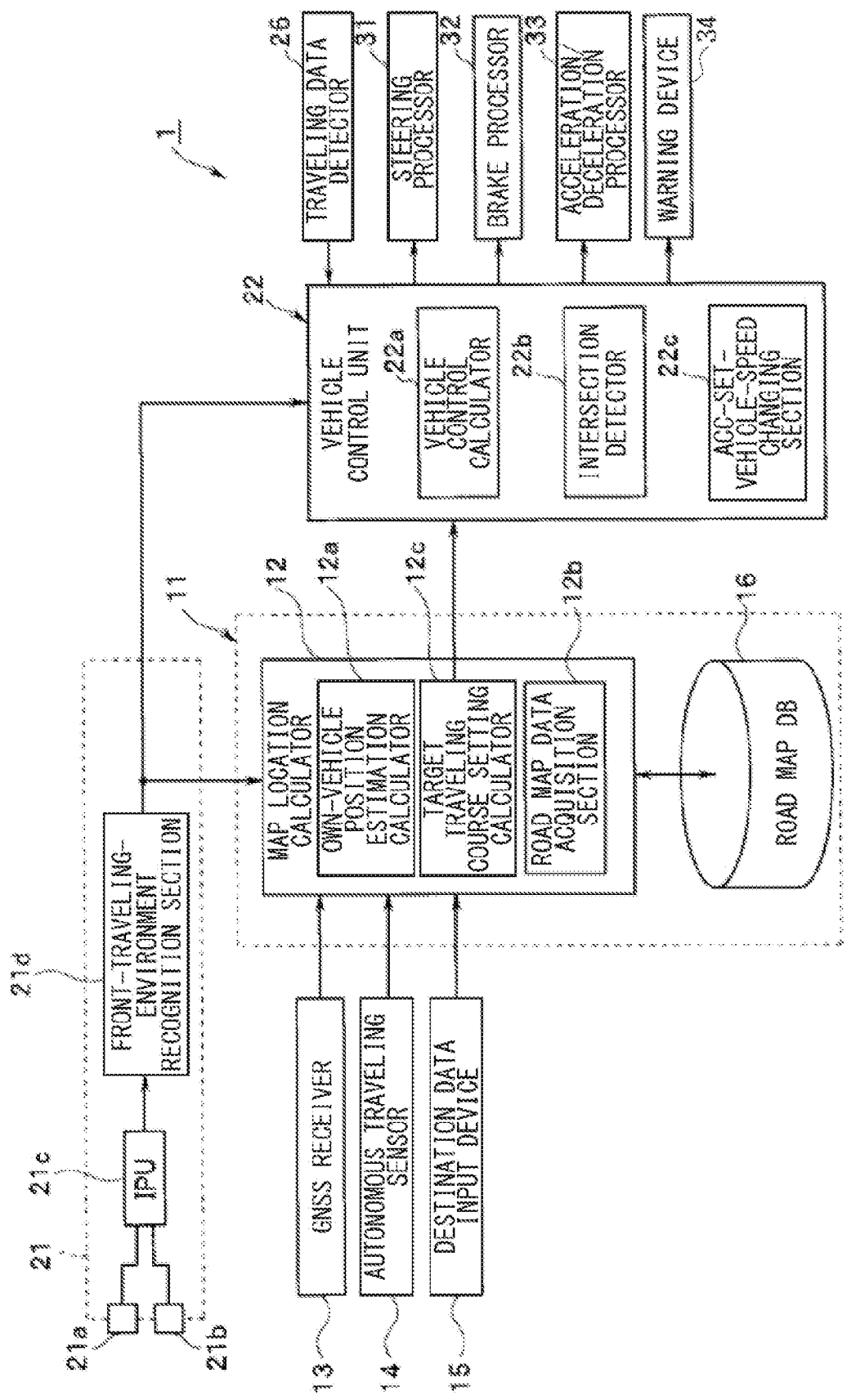
FIG. 1 is a diagram schematically illustrating a configuration of an automatic driving assistance system according to one example embodiment of the technology.

In some cases, an own vehicle travels straight along a road having two successive intersections where traffic lights are respectively installed. In such cases, an automatic driving assistance system determines a color of a signal indicated by the traffic light installed at one of the two intersections which is closer to the own vehicle (hereinafter also referred to as "closer intersection") on the basis of data on a traveling environment in front of the own vehicle obtained by a vehicle-mounted camera, for example. If the color is determined to be green, the automatic driving assistance system causes the own vehicle to pass the closer intersection at an ACC set vehicle speed. Thereafter, if the automatic driving assistance system recognizes a red signal indicated by the traffic light installed at the other intersection which is farther than the closer intersection from the own vehicle (hereinafter also referred to as "farther intersection"), the automatic driving assistance system performs deceleration control to cause the own vehicle to stop before the own vehicle reaches a stop line of the farther intersection.

However, in a case where an interval between the two intersections is short, the automatic driving assistance system has had to perform abrupt deceleration control which is not intended by a driver, in order to stop at the intersection of the red signal light. This has resulted in deterioration of ride comfort of an occupant.

It is desirable to provide an automatic driving assistance system that is able to suppress abrupt deceleration control which is not intended by a driver.

In the following, some example embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

First, a schematic configuration of an automatic driving assistance system according to one example embodiment of the technology will be described below with reference to a block diagram illustrated in FIG. 1.

Figure 2:
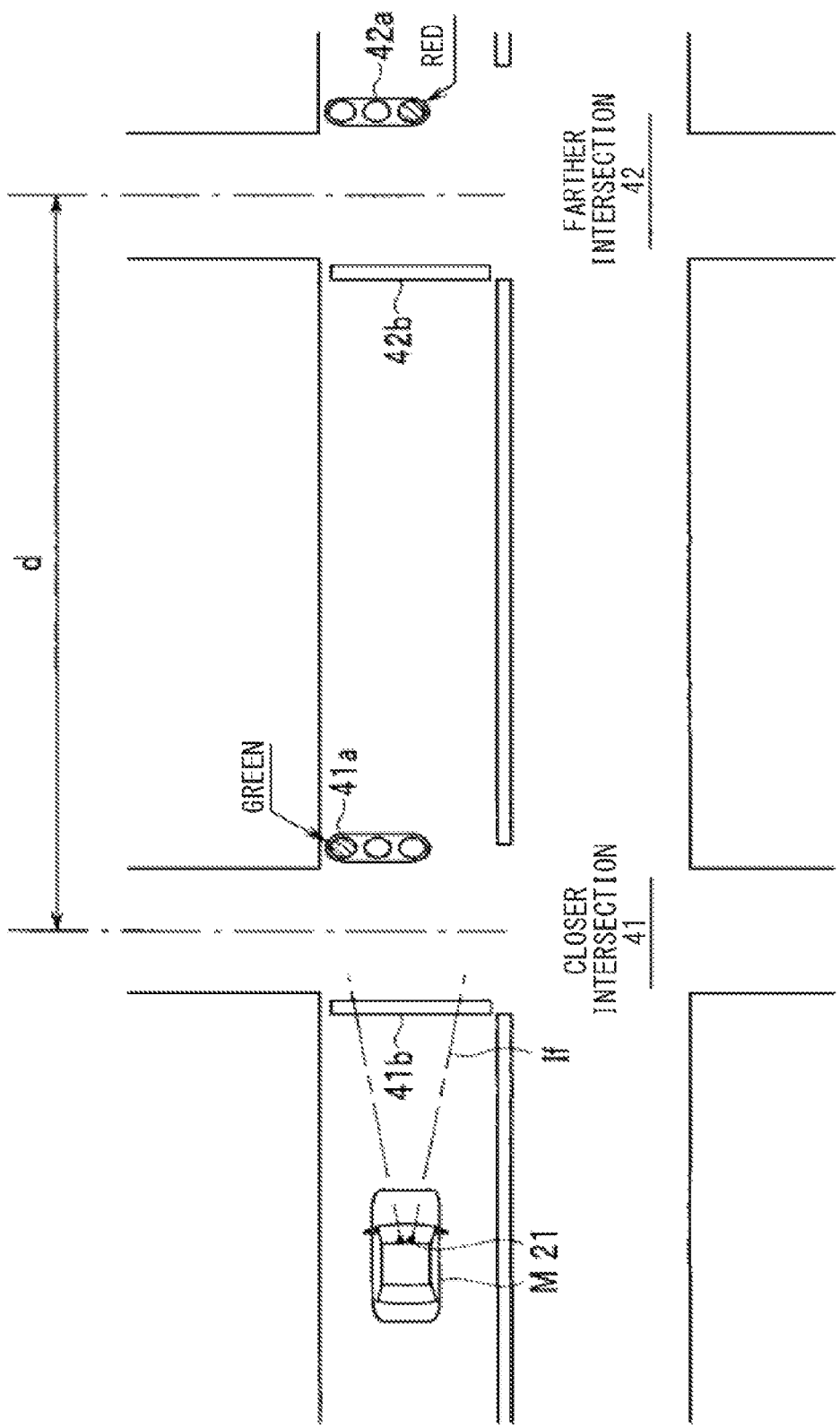
FIG. 2 is a diagram illustrating an example road on which a closer traffic light at a closer intersection and a farther traffic light at a farther intersection are successively installed.

An automatic driving assistance system 1 illustrated in FIG. 1 may be mounted on an own vehicle M (see FIG. 2). The automatic driving assistance system 1 may include a locator unit 11, a camera unit 21, and a vehicle control unit 22. The locator unit 11 may detect a position of the own vehicle M (hereinafter also referred to as "own-vehicle position"). The camera unit 21 may acquire front-traveling-environment data. The vehicle control unit 22 may control the own vehicle M.

The locator unit 11 may estimate the own-vehicle position on a road map and acquire road map data on a region around the own-vehicle position. The camera unit 21 may acquire the traveling-environment data on an environment in front of the own vehicle M and recognize two lane lines defining left and right of a lane along which the own vehicle M is traveling, a road feature, presence of a preceding vehicle, and presence of a traffic light, for example. The camera unit 21 may also determine a road curvature of a middle of the lane between the left and right lane lines, an intervehicle distance between the own vehicle M and the preceding vehicle, and a relative speed between the own vehicle M and the preceding vehicle, for example.

The locator unit 11 may include a map location calculator 12 and a high-precision road map database 16 that serves as a storage. The high-precision road map database 16 is abbreviated as "road map DB 16" in FIG. 1. The map location calculator 12, a front-traveling-environment recognition section 21d to be described below, and the vehicle control unit 22 may each include a known microcomputer that includes a central processing unit (CPU), a random access memory (RAM), and a read only memory (ROM), for example, and a peripheral device. The ROM may preliminarily store a program to be executed by the CPU and a base map or other fixed data, for example.

The map location calculator 12 may have an input terminal coupled to a global navigation satellite system (GNSS) receiver 13, an autonomous traveling sensor 14, and a destination data input device 15. The GNSS receiver 13 may receive positioning signals from a plurality of positioning satellites. The autonomous traveling sensor 14 may help achieve autonomous traveling of the own vehicle M in an environment, such as a region in a tunnel, where the own vehicle M has difficulty in receiving effective positional signals from the GNSS satellites due to decreased sensitivity of the GNSS receiver 13. The autonomous traveling sensor 14 may include a vehicle speed sensor, a gyroscope sensor, and a longitudinal acceleration sensor, for example. The map location calculator 12 may determine a travel distance and an azimuth of the own vehicle M on the basis of a vehicle speed of the own vehicle M (hereinafter also referred to as "own-vehicle speed") detected by the vehicle speed sensor, an angular speed detected by the gyroscope sensor, and a longitudinal acceleration detected by the longitudinal acceleration sensor. On the basis of the travel distance and the azimuth, the map location calculator 12 may perform localization of the position of the own vehicle M.

The destination data input device 15 may be a terminal device to be operated by a person on a vehicle such as a driver or a passenger. The destination data input device 15 may be used to enter a set of data demanded for determining a traveling route in the map location calculator 12, such as a destination and a transit point (e.g., a service area of a highway).

The destination data input device 15 may be, in one example, an input unit of a car navigation system (e.g., a touch panel of a monitor), a portable terminal such as a smart phone, or a personal computer. The destination data input device 15 may be coupled to the map location calculator 12 via wire or radio.

When the driver or the passenger operates the destination data input device 15 to input data on the destination or the transit point, such as a name of a facility, an address, or a telephone number, the map location calculator 12 may read the input data. The map location calculator 12 may set positional coordinates (i.e., a latitude and a longitude) of the inputted destination or transit point.

The map location calculator 12 may include an own-vehicle position estimation calculator 12a, a road map data acquisition section 12b, and a target traveling course setting calculator 12c. The own-vehicle position estimation calculator 12a may estimate the own-vehicle position. The target traveling course setting calculator 12c may set a target traveling course. The own-vehicle position estimation calculator 12a may acquire positional data of the own vehicle M that indicates the positional coordinates (i.e., a latitude and a longitude) of the own vehicle M, on the basis of positional signals received by the GNSS receiver 13. While the own vehicle M is traveling in an environment where the own vehicle M has difficulty in receiving effective positional signals from the GNSS satellites due to decreased sensitivity of the GNSS receiver 13, the own-vehicle position estimation calculator 12a may estimate the positional coordinates of the own vehicle M on the basis of signals from the autonomous traveling sensor 14.

The road map data acquisition section 12b may perform map matching of the positional coordinates of the own vehicle M and the positional coordinates (i.e., the latitude and the longitude) of the destination set by the destination data input device 15 on the road map stored in the high-precision road map database 16. The road map data acquisition section 12b may thereby identify the position of the own vehicle M and the position of the destination, and transmit, to the target traveling course setting calculator 12c, road map data on the road map from the current position of the own vehicle M to a region around the destination.

The high-precision road map database 16 may be stored in a mass storage medium, such as a hard disk drive (HDD), and include high-precision road map data or a dynamic map. The high-precision road map data may include lane data, such as data on a width of the lane, data on coordinates of the middle of the lane, data on an azimuthal angle of the lane in the traveling direction, data on a speed limit, and any other pieces of data necessary for execution of automatic driving. The lane data may be allocated to respective lanes on the road map. For example, the lane data may be allocated to respective regions of each lane on the road map, and the respective regions may extend along the lane at several meter intervals.

The target traveling course setting calculator 12c may first create, on the road map, a traveling route connecting the current position of the own vehicle M and the position of the destination that are identified through the map matching by the road map data acquisition section 12b. Thereafter, the target traveling course setting calculator 12c may sequentially determine, on the traveling route, a target traveling course along which the own vehicle M is to automatically travel, and update the target traveling course. For example, the target traveling course may be set as a traveling course extending straight ahead, a traveling course turning right or left at an intersection, a traveling course set on a left lane, a middle lane, or a right lane of a straight road, or a traveling course defining a lateral position of the own vehicle M on the lane. The target traveling course may extend several hundred meters or several kilometers ahead of the own vehicle M. Note that the data on the target traveling course may be read by the vehicle control unit 22.

The camera unit 21 may be fixed on an upper central portion of a front interior side of the own vehicle M. The camera unit 21 may include a vehicle-mounted camera, an image processing unit (IPU) 21c, and the front-traveling-environment recognition section 21d. The vehicle-mounted camera may be a stereo camera that includes a main camera 21a and a sub-camera 21b disposed at respective positions bilaterally symmetric to each other about a line extending through a middle of a width of the own vehicle M. The camera unit 21 may cause the main camera 21a and the sub-camera 21b to capture an image of a predetermined region If (see FIG. 2) in front of the own vehicle M (i.e., acquire traveling-environment image data), and cause the IPU 21c to perform predetermined image processing on the traveling-environment image data.

The front-traveling-environment recognition section 21d may read the traveling-environment image data subjected to the image processing by the IPU 21c to recognize a front traveling environment (i.e., front-traveling-environment data) on the basis of the traveling-environment image data. The front-traveling-environment data recognized by the front-traveling-environment recognition section 21d may include data on a road feature of the traveling course of the own vehicle M (hereinafter also referred to as an "own-vehicle traveling course"), data on an intersection, data on a color of a signal indicated by a traffic light, data on road signs, and data on a pedestrian or a bicycle crossing the lane, for example. Specific but non-limiting examples of the data on the road feature of the own-vehicle traveling course may include a road curvature [1/m] of the middle of the lane between two lane lines defining left and right of the lane, and the width of the lane between the left and right lane lines (i.e., lane width).

The vehicle control unit 22 may include a vehicle control calculator 22a, an intersection detector 22b, and an ACC-set-vehicle-speed changing section 22c. The vehicle control unit 22 may have an input terminal coupled to the target traveling course setting calculator 12c of the map location calculator 12, the front-traveling-environment recognition section 21d of the camera unit 21, and a traveling data detector 26, for example. The traveling data detector 26 may detect traveling data. The vehicle control unit 22 may acquire a traveling environment in a predetermined range of a target traveling course in front of the own vehicle M, on the basis of the road map data around the target traveling course determined by the target traveling course setting calculator 12c and the front-traveling-environment data recognized by the front-traveling-environment recognition section 21d. In one embodiment, the intersection detector 22b may serve as an "intersection detector". In one embodiment, the ACC-set-vehicle-speed changing section 22c may serve as an "adaptive-cruise-control-set-vehicle-speed changing section". The traveling data detector 26 may include various sensors that detect data on traveling of the own vehicle M, such as a vehicle speed of the own vehicle M (i.e., own-vehicle speed), acceleration and deceleration rates, a time required to reach a stop line, an intervehicle distance between a preceding vehicle and the own vehicle M, a relative speed between the preceding vehicle and the own vehicle M, and any other pieces of data necessary for execution of the automatic driving of the own vehicle M.

Additionally, the vehicle control unit 22 may have an output terminal coupled to a steering processor 31, a brake processor 32, an acceleration/deceleration processor 33, and a warning device 34. The steering processor 31 may cause the own vehicle M to travel along the target traveling course. The brake processor 32 may decelerate or stop the own vehicle M by forcible braking. The acceleration/deceleration processor 33 may control a vehicle speed of the own vehicle M. The warning device 34 may inform the driver of a warning in accordance with a situation recognized on the basis of the front traveling environment.

The vehicle control calculator 22a may perform a predetermined control on the steering processor 31, the brake processor 32, and the acceleration/deceleration processor 33 to cause the own vehicle M to automatically travel along the target traveling course on the road map on the basis of the positioning signals indicating the position of the own vehicle M received by the GNSS receiver 13. As described above, the target traveling course may be determined by the target traveling course setting calculator 12c. During the automatic driving, the vehicle control calculator 22a may perform a known adaptive cruise control (ACC) and a known active lane keep (ALK) control on the basis of the front traveling environment recognized by the front-traveling-environment recognition section 21d. When detecting a preceding vehicle, the vehicle control calculator 22a may cause the own vehicle M to travel following the preceding vehicle. When detecting no preceding vehicle, the vehicle control calculator 22a may cause the own vehicle M to travel along the traveling lane at a first ACC set vehicle speed set by the driver. The upper limit of the first ACC set vehicle speed may be a speed limit of the road on which the own vehicle is traveling.

The intersection detector 22b may constantly detect whether a set of intersections whose interval is shorter than a predetermined interval is present within a predetermined range, e.g., 300 meters, of the target traveling course in front of the own vehicle M, on the basis of a traveling environment in the predetermined range of the target traveling course in front of the own vehicle M acquired by the vehicle control unit 22. In one example, the intersection detector 22b may constantly detect whether a set of intersections satisfying a condition of Expression (1) is present within the predetermined range, e.g., 300 meters, of the target traveling course in front of the own vehicle M.

$$V_{ACC}^2/2a_{max} > d \qquad (1)$$

where "$V_{ACC}$" may represent a first ACC set vehicle speed [m/s] set by the driver, for example, "$a_{max}$" may represent a deceleration rate [m/s$^2$] of automatic deceleration control, and "d" may represent a distance [m] between two intersections.

If the intersection detector 22b detects the set of intersections whose interval is shorter than the predetermined interval, the ACC-set-vehicle-speed changing section 22c may change the ACC set vehicle speed from the first ACC set vehicle speed set by the driver, for example, to a second ACC set vehicle speed. In one example, if the intersection detector 22b detects the set of intersections satisfying Expression (1), the ACC-set-vehicle-speed changing section 22c may change the ACC set vehicle speed from the first ACC set vehicle speed to the second ACC set vehicle speed which is determined by Expression (2).

$$\sqrt{(d \times 2a_{max})} \qquad (2)$$

If the intersection detector 22b no longer detects, after the changing the ACC set vehicle speed to the second ACC set vehicle speed, the set of intersections whose interval is shorter than the predetermined interval, the ACC-set-vehicle-speed changing section 22c may change the ACC set vehicle speed from the second ACC set vehicle speed to the first ACC set vehicle speed set by the driver, for example.

The ACC-set-vehicle-speed changing control process will be described in more detail with reference to FIG. 2. FIG. 2 illustrates an example in which the own vehicle M travels straight through two intersections. The two intersections may include: an intersection which is closer to the own vehicle M (hereinafter referred to as "closer intersection") 41 and an intersection which is farther than the closer intersection 41 from the own vehicle M (hereinafter also referred to as "farther intersection") 42.

At the closer intersection 41, a traffic light which is closer to the own vehicle M (hereinafter referred to as "closer traffic light") 41a and a stop line which is closer to the own vehicle M (hereinafter referred to as "closer stop line") 41b may be installed. At the farther intersection 42, a traffic light which is farther than the closer traffic light 41a from the own vehicle M (hereinafter also referred to as "farther traffic light") 42a and a stop line which is farther than the closer stop line 41b from the own vehicle M (hereinafter also referred to as "farther stop line") 42b may be installed.

In a case where the vehicle control unit 22 determines that the closer traffic light 41a installed at the closer intersection 41 indicates a green signal or an arrow signal that permits vehicles to advance on the basis of the front traveling environment recognized by the front-traveling-environment recognition section 21d of the camera unit 21, the vehicle control unit 22 may control the own vehicle M to pass through the closer intersection 41 at the first ACC set vehicle speed set by the driver, for example.

Thereafter, if the vehicle control unit 22 determines that the farther traffic light 42a installed at the farther intersection 42 indicates a red signal that prohibits vehicles from advancing on the basis of the front traveling environment recognized by the front-traveling-environment recognition section 21d of the camera unit 21, the vehicle control unit 22 may control the brake processor 32 and the acceleration/deceleration processor 33, for example, to perform deceleration control in order to cause the own vehicle M to stop before the own vehicle M reaches the farther stop line 42b. In this situation, in a case where a distance between the closer intersection 41 and the farther intersection 42 is represented by "d" [m] and where the distance d [m] is shorter than the predetermined interval, abrupt deceleration control which is not intended by the driver has to be performed, which can deteriorate the ride comfort. The distance d [m] may be the distance between the closer intersection 41 and the farther intersection 42, but is not limited thereto. The distance d [m] may also be a distance between the closer traffic light 41a and the farther traffic light 42a, or a distance between the closer stop line 41b and the farther stop line 42b.

An upper limit value of the deceleration rate $a_{max}$ [m/s$^2$] of the automatic deceleration control may be set in advance. The upper limit value of the deceleration rate $a_{max}$ [m/s$^2$] may be set in such a range that the ride comfort of the occupant is not deteriorated. The upper limit value may be set to, for example, about 0.3 G to about 0.4 G (about 2.94 [m/s$^2$] to about 3.92 [m/s$^2$]), where "G" may represent a gravitational acceleration.

When the first ACC set vehicle speed is set to $V_{ACC}$ [m/s] by the driver, for example, and the own vehicle M travels at a speed of $V_{ACC}$ [m/s], a distance that the own vehicle M travels until the own vehicle M stops after continuously decelerating at the deceleration rate $a_{max}$ [m/s$^2$] may be calculated by Expression (3).

$$\int (V_{ACC} - a_{max} t) dt \qquad (3)$$

where an integration range may be from 0 to $V_{ACC}/a_{max}$.

When the own vehicle M travels at a speed of $V_{ACC}$ [m/s], the distance that the own vehicle M travels until the own vehicle M stops after continuously decelerating at the deceleration rate $a_{max}$ [m/s$^2$] may be calculated, by Expression (3), to be $V_{ACC}^2/2a_{max}$ [m].

In other words, in a case where $V_{ACC}^2/2a_{max}$ [m], which is the distance that the own vehicle M travels until the own vehicle M stops, is less than or equal to the distance d [m] between the closer intersection 41 and the farther intersection 42, it is possible for the own vehicle M to decelerate without deteriorating the ride comfort and to stop. In contrast, in a case where $V_{ACC}^2/2a_{max}$ [m], which is the distance that the own vehicle M travels until the own vehicle M stops, is longer than the distance d [m] between the closer intersection 41 and the farther intersection 42, i.e., the condition of Expression (1) is satisfied, deceleration control which exceeds the upper limit of the deceleration rate $a_{max}$ [m/s$^2$] has to be performed, which can deteriorate the ride comfort of the occupant.

Accordingly, in a case where the intersection detector 22b detects the set of intersections whose interval is shorter than the predetermined interval, the ACC-set-vehicle-speed changing section 22c may change the ACC set vehicle speed from the first ACC set vehicle speed set by the driver, for example, to the second ACC set vehicle speed calculated by Expression (2).

Figure 3:
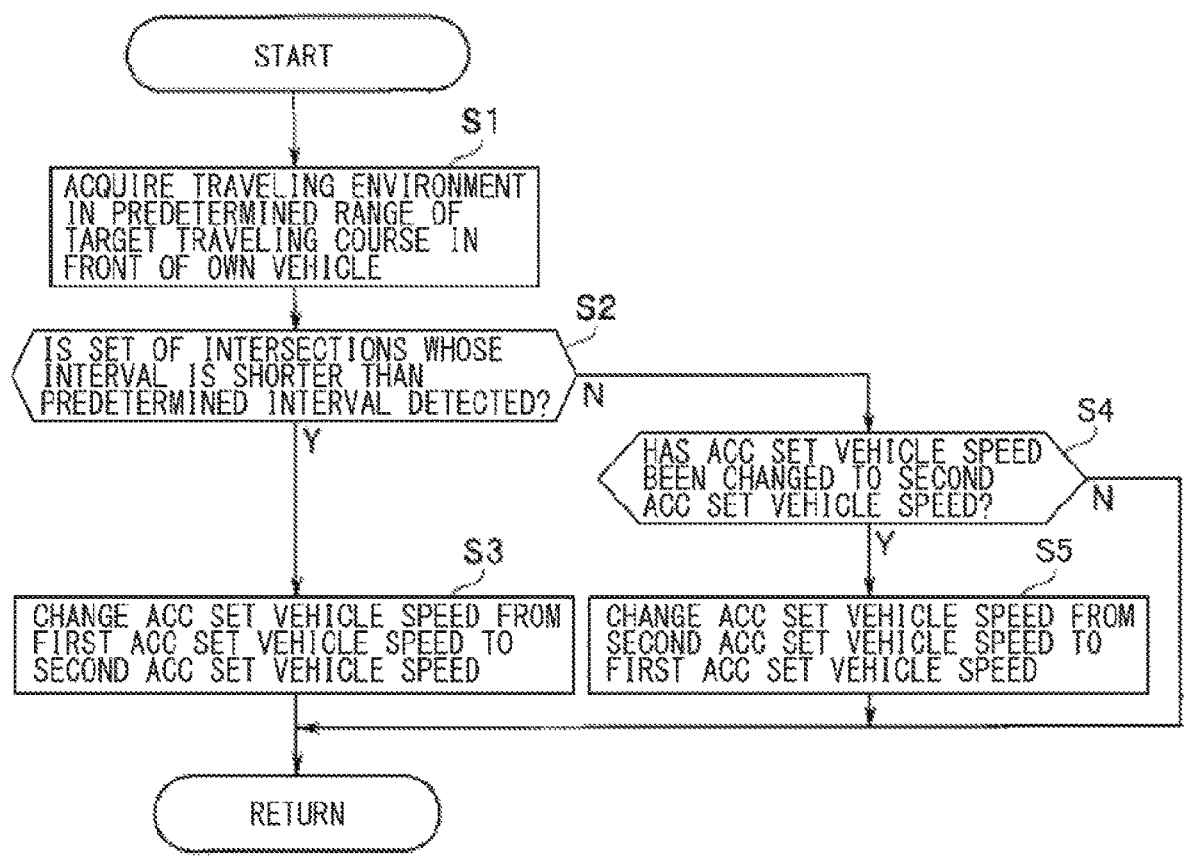
FIG. 3 is a flowchart illustrating an example of an ACC-set-vehicle-speed changing control process.

The ACC-set-vehicle-speed changing control process will be described with reference to FIG. 3. Note that the ACC-set-vehicle-speed changing control process of FIG. 3 may be executed for each predetermined calculation cycle by the vehicle control unit 22 during the automatic driving.

The vehicle control unit 22 may first acquire the traveling environment in the predetermined range, e.g., 300 meters, of the target traveling course in front of the own vehicle M, on the basis of the road map data acquired by the road map data acquisition section 12b and the front traveling environment (i.e., front-traveling-environment data) recognized by the front-traveling-environment recognition section 21d of the camera unit 21 (step S1).

The vehicle control unit 22 may determine whether the intersection detector 22b detects the set of intersections whose interval is shorter than a predetermined interval within the predetermined range of the target traveling course in front of the own vehicle M on the basis of the traveling environment acquired in step S1 (step S2). The intersection detector 22b may detect the set of intersections whose interval is shorter than the predetermined interval by using Expression (1) described above.

If the vehicle control unit 22 determines that the intersection detector 22b has detected the set of intersections whose interval is shorter than the predetermined interval within the predetermined range of the target traveling course in front of the own vehicle M (S2: Y), the vehicle control unit 22 may change the ACC set vehicle speed from the first ACC set vehicle speed to the second ACC set vehicle speed (step S3), and cause the process to end. The first ACC set vehicle speed may be a vehicle speed set by the driver, for example. The second ACC set vehicle speed may be a vehicle speed calculated using Expression (2) described above. The second ACC set vehicle speed may be slower than the first ACC set vehicle speed.

If the vehicle control unit 22 determines that the intersection detector 22b detects no set of intersections whose interval is shorter than the predetermined interval within the predetermined range of the target traveling course in front of the own vehicle M (S2: N), the vehicle control unit 22 may determine whether the ACC set vehicle speed has been changed to the second ACC set vehicle speed (step S4).

If the vehicle control unit 22 determines that the ACC set vehicle speed has not been changed to the second ACC set vehicle speed (S4: N), the vehicle control unit 22 may cause the process to end.

If the vehicle control unit 22 determines that the ACC set vehicle speed has been changed to the second ACC set vehicle speed (S4: Y), the vehicle control unit 22 may change the ACC set vehicle speed from the second ACC set vehicle speed to the first ACC set vehicle speed (step S5) and cause the process to end. In other words, if the intersection detector 22b detects no set of intersections whose interval is shorter than the predetermined interval within the predetermined range of the target traveling course in front of the own vehicle M in a state in which the ACC set vehicle speed has been changed to the second ACC set vehicle speed, the vehicle control unit 22 may turn the ACC set vehicle speed back to the original first ACC set vehicle speed from the second ACC set vehicle speed to which the ACC set vehicle speed has been changed.

According to the above ACC-set-vehicle-speed changing control process, in a case where the automatic driving assistance system 1 detects the set of intersections whose interval is shorter than the predetermined interval within the predetermined range of the target traveling course in front of the own vehicle M, the automatic driving assistance system 1 may change the ACC set vehicle speed from the first ACC set vehicle speed set by the driver, for example, to the second ACC set vehicle speed which is slower than the first ACC set vehicle speed. Thus, the automatic driving assistance system 1 will not have to perform abrupt deceleration control in order to stop the own vehicle M, even if the farther traffic light 42a installed at the farther intersection 42 indicates the red signal when the own vehicle M passes through the closer intersection 41. This makes it possible to improve the ride comfort of the occupant. As a result, the automatic driving assistance system 1 according to one example embodiment makes it possible to suppress the abrupt deceleration control which is not intended by the driver.

Note that the steps in the flowchart in this specification may be executed in a different order for each execution, or a plurality of steps may be executed simultaneously, as long as the order of execution is consistent with the nature of the flowchart.

One or more of the intersection detector 22b and the ACC-set-vehicle-speed changing section 22c illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the intersection detector 22b and the ACC-set-vehicle-speed changing section 22c. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the intersection detector 22b and the ACC-set-vehicle-speed changing section 22c illustrated in FIG. 1.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. An automatic driving assistance system to be applied to a vehicle, the automatic driving assistance system comprising:
   an intersection detector configured to detect, on a basis of a traveling environment in a predetermined range of a target traveling course in front of the vehicle, an interval between consecutive intersections that is shorter than a predetermined interval within the predetermined range of the target traveling course in front of the vehicle, the traveling environment being to be acquired on a basis of road map data to be acquired by a road map data acquisition section and traveling-environment data on an environment in front of the vehicle to be acquired by a camera unit; and
   an adaptive-cruise-control-set-vehicle-speed changing section configured to change, in a case where the intersection detector detects the interval between consecutive intersections as being shorter than the predetermined interval, an adaptive-cruise-control set vehicle speed from a first adaptive-cruise-control set vehicle speed that is set to a second adaptive-cruise-control set vehicle speed.

2. The automatic driving assistance system according to claim 1, wherein the intersection detector is configured to detect, on the basis of the traveling environment in the predetermined range of the target traveling course, whether the consecutive intersections that satisfy Expression (1) is present within the predetermined range of the target traveling course in front of the vehicle, and, in a case where the intersection detector detects that the consecutive intersections that satisfy Expression (1) is present within the predetermined range of the target traveling course in front of the vehicle, the adaptive-cruise-control-set-vehicle-speed changing section is configured to change the adaptive-cruise-control set vehicle speed from the first adaptive-cruise-control set vehicle speed to the second adaptive-cruise-control set vehicle speed, the second adaptive-cruise-control set vehicle speed being calculated by Expression (2), $$V_{ACC}^2/2a_{max} > d \qquad (1)$$

$$\sqrt{(d \times 2a_{max})} \qquad (2)$$

where "$V_{ACC}$" represents the first adaptive-cruise-control set vehicle speed, "$a_{max}$" represents a deceleration rate of automatic deceleration control, and "d" represents a distance between the intersections.

3. The automatic driving assistance system according to claim 1, wherein the adaptive-cruise-control-set-vehicle-speed changing section is configured to, in a case where the intersection detector detects that the interval between consecutive intersections being shorter than the predetermined interval is absent within the predetermined range in a state in which the adaptive-cruise-control set vehicle speed has been changed to the second adaptive-cruise-control set vehicle speed, change the adaptive-cruise-control set vehicle speed from the second adaptive-cruise-control set vehicle speed to the first adaptive-cruise-control set vehicle speed.

4. The automatic driving assistance system according to claim 2, wherein the adaptive-cruise-control-set-vehicle-speed changing section is configured to, in a case where the intersection detector detects that the interval between consecutive intersections being shorter than the predetermined interval is absent within the predetermined range in a state in which the adaptive-cruise-control set vehicle speed has been changed to the second adaptive-cruise-control set vehicle speed, change the adaptive-cruise-control set vehicle speed from the second adaptive-cruise-control set vehicle speed to the first adaptive-cruise-control set vehicle speed.

5. An automatic driving assistance system to be applied to a vehicle, the automatic driving assistance system comprising circuitry configured to:

detect, on a basis of a traveling environment in a predetermined range of a target traveling course in front of the vehicle, an interval between consecutive intersections that is shorter than a predetermined interval within the predetermined range of the target traveling course in front of the vehicle, the traveling environment being to be acquired on a basis of road map data and traveling-environment data on an environment in front of the vehicle; and change, in a case where the circuitry detects the interval between consecutive intersections as being shorter than the predetermined interval, an adaptive-cruise-control set vehicle speed from a first adaptive-cruise-control set vehicle speed that is set to a second adaptive-cruise-control set vehicle speed.

6. The automatic driving assistance system of claim 1, the consecutive intersections comprising (1) a closer intersection comprising a closer traffic light and a closer stop line and (2) a farther intersection comprising a farther traffic light and a farther stop line, wherein the adaptive-cruise-control-set-vehicle-speed changing section is configured to, in a case where the intersection detector determines (1) that the closer traffic indicates a first signal that permits vehicles to advance and (2) that the farther traffic light indicates a second signal that prohibits vehicles from advancing, perform a deceleration control to stop the vehicle before the vehicle reaches the farther stop line.

7. The automatic driving assistance system of claim 5, the consecutive intersections comprising (1) a closer intersection comprising a closer traffic light and a closer stop line and (2) a farther intersection comprising a farther traffic light and a farther stop line, wherein the adaptive-cruise-control-set-vehicle-speed changing section is configured to, in a case where the intersection detector determines that (1) the closer traffic indicates a first signal that permits vehicles to advance and (2) the farther traffic light indicates a second signal that prohibits vehicles from advancing, perform a deceleration control to stop the vehicle before the vehicle reaches the farther stop line.

* * * * *